3,256,357
TEMPERATURE CONTROL IN HYDRO-DEALKYLATION PROCESS
George P. Baumann, Sparta, and Aaron Preiser, North Plainfield, N.J., assignors to Esso Research and Engineering Company, a corporation of Delaware
Filed Apr. 17, 1964, Ser. No. 360,622
20 Claims. (Cl. 260—672)

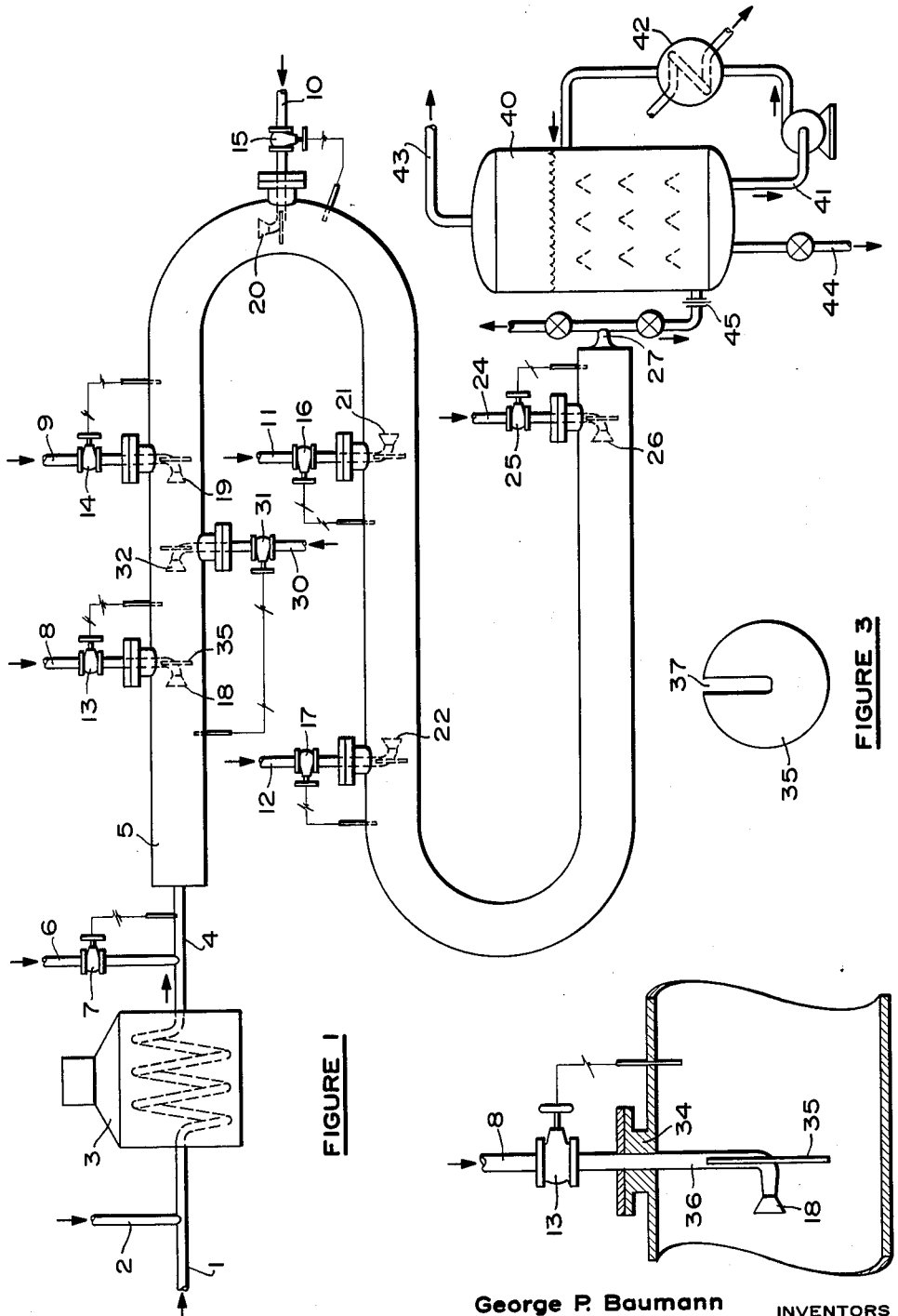

This application is a continuation-in-part of our application Serial No. 91,832, filed February 27, 1961 and now abandoned.

The present invention relates to an improved method for the hydrodealkylation of alkyl substituted aromatics. More particularly this invention relates to the demethylation of alkyl aromatics at elevated temperatures and pressures in the absence of catalytic or non-catalytic solids to form aromatics such as benzene or naphthalene per se or alkyl substituted benzenes or naphthalenes containing fewer carbon atoms in the alkyl groups than were contained in the alkyl groups of the alkylated aromatic feed stocks.

The hydrodealkylation of a large number of alkyl substituted aromatic compounds has been described in a number of patents and technical articles. It has been proposed, in this connection to carry out the hydrodealkylation catalytically and non-catalytically.

The non-catalytic demethylation or dealkylation reactions are not only exothermic in nature but also exhibit a very high temperature coefficient of rate of reaction. Since a temperature above about 1100° F. is required to initiate the reaction, it is extremely important to maintain accurate control of the temperature. Moreover, in view of the temperature levels necessary to effect the non-catalytic hydrodealkylation it is essential to maximize conversion in a single pass through the reaction zone. This is extremely important to the economics of the process since the costs involved in heating the reactants to reaction temperature and recovering heat from the reaction products are quite substantial. However, at the temperatures necessary to achieve high conversions, i.e. at least about 80% per pass, temperature runaway can occur very readily leading to severe coking of the reaction zone, and of course, loss of feed and product to by-products of little or no value.

It has been proposed to effect control of the temperature in a non-catalytic hydrodealkylation reaction zone by supplying catalytically inert finely divided solids thereto in a fluidized solids system. This has proved to be impractical, however, because of the fact that finely divided solid particles regardless of their nature (alpho alumina, quartz, Carborundum, mullite or the like) act as nuclei or seeds on which coke deposits leading to a marked increase in the amount of coke formed in the reaction over that formed in a solids-free reaction system. It has also been found that the backmixing of reactants that occurs in the fluidized beds of inert heat transfer solids and the non-uniform reaction times caused thereby, lead to relatively high coke formation, rupture of the carbon rings present, excessive hydrogen consumption, and lower yields of dealkylated product. A secondary effect of this coke deposition upon the finely divided solids is an increase in the average particle size of the finely divided solids which alters their fluidization characteristics. This in turn requires that means for withdrawing enlarged particles and other means for supplying fresh, properly sized particles must be provided in such a reaction system.

Catalysts have been used in hydrodealkylation reaction systems in view of the fact that they are expected to lower the average temperature required. In catalytic hydrodealkylation however, catalyst activity must be maintained at a high level by the use of large quantities of hydrogen which minimize the deposition of coke. Those quantities of hydrogen, however, adversely effect the kinetics of the reaction which can be overcome by raising temperature. Moreover, the presence of catalytic solids, as in the case of catalytically inert solids, has a tendency to cause an increase in carbon formation. This, in turn, would tend to nullify the catalytic nature of the operation since the accumulation of a coating of coke or carbon reduces the catalyst activity thus necessitating increases in temperature levels towards those used in thermal dealkylation in order to maintain conversion.

The highly exothermic thermal hydrodealkylation reaction thus presents a major temperature control problem throughout the reaction zone and particularly at the inlet portion of the reaction zone which is most sensitive to such conditions as feed preheat changes, paraffin concentration of the feed stream and failure of one of the hydrogen compressors. An increase of about 10° F. in the feed preheat temperature or a sudden increase of about 0.5 wt. percent in the paraffin concentration of the feed can cause a temperature runaway of about 200° F. in the outlet temperature in a very short period of operation. Since two or more factors affecting the reaction can change to the detriment of the operation with little or no warning it may readily be seen that close temperature control is absolutely essential to prevent temperature runaways with consequent coking of the reactor, product loss due to hydrocracking and possible equipment damage.

It is the object of this invention to provide an improved process for the hydrodealkylation of alkylated aromatic hydrocarbons.

It is also the object of this invention to provide effective control of the temperature at which thermal hydrodealkylation of alkylated aromatic feed streams is carried out.

It is a further object of this invention to provide a process for the hydrodealkylation of alkylated aromatic hydrocarbons which will not suffer a runaway in reactor outlet temperature when a hydrogen compressor fails or feed preheat temperature and/or feed paraffin concentration increases.

These and other objects will appear more clearly from the specification and claims which follow.

In accordance with the present invention, non-catalytic hydrodealkylation of alkyl substituted aromatic hydrocarbons is carried out in a reaction zone having a high $L/D$ ratio which is free of extraneous solids and close temperature control is maintained with the addition of small amounts of sulfur or nitrogen compounds to the hydrogen-alkylated aromatics feed stream to nullify any catalytic effect of the metals used in the feed preheat and/or reaction zones and the controlled addition of further amounts of cool, hydrogen-rich gas at several points through the reaction zone. This addition of hydrogen (1) maintains a high hydrogen content of the gas stream through the reaction zone, thus enhancing the dealkylation reaction, and (2) simultaneously controls temperature in the highly exothermic reaction. The hydrogen provided in the initial feed stream and added at spaced points in the reactor in combination with the nitrogen or sulfur compounds controls and substantially eliminates coke formation.

It should be noted that only the present process solves the problem of close temperature control economically. Expedients such as greatly increasing the amount of hydrogen gas initially supplied to the reaction zone with the alkylated aromatic feed stream would be an uneconomic way to control and carry out the exothermic reaction and maintain high ratios of hydrogen to hydrocarbon material through the reaction zone. Similarly, introduction of inert quench streams at points through the reaction zone to control temperatures is undesirable. Inert quench streams dilute the concentration of the reactants, and specifically of the hydrogen in the stream without replacing that hydrogen consumed in the dealkylation reaction. This high hydrogen content through the reactor has now been found to be essential to avoid the high coke formation. If liquid quenches are used, impingement of the liquid on the reactor walls can cause serious mechanical problems. If the quench liquid is a hydrocarbon, impingement on the hot reactor wall can also cause severe coke formation. It is further noted that the introduction of large amounts of hydrogen with the aromatic feed stream and/or the introduction of inert streams to control temperature requires a considerable increase in reactor size and increases the investment and operating costs to provide feed preheat and heat removal from the reactor products. Finally, it should be noted that according to the present process the excess hydrogen supplied (not consumed in the reaction) recovered from the reaction products has a high hydrogen content. Thus, it may be effectively used directly in other processes such as hydrofining of hydroformer feed stocks or other sulfur-bearing hydrocarbons or may be economically processed to increase its hydrogen content back to above 80%, preferably above 90%, e.g. 92%, for recycle to the present process. The hydrogen-containing gas separated from the dealkylated aromatic product may also be used directly as the coolant gas added at spaced points along the reactor in accordance with this invention.

The feed stock for the present process may suitably comprise aromatic hydrocarbons containing in excess of about 40% by volume of aromatic hydrocarbons. These stocks may contain alkylated aromatic hydrocarbons such as toluene, xylenes, ethyl benzene, propyl benzene, methylethyl benzene, diethyl benzene and the like. The feed stock may also contain the indanes such as 1-methylindane; 2-methylindane; 4-methylindane; 5-methylindane; 4,5,6-trimethylindane; 1,1-dimethylindane; 1,2-dimethylindane; 1,2,3-trimethylindane; 1,2,3,4,5,6,7-heptamethylindane. The aromatic hydrocarbon fraction may also contain alkyl naphthalenes and compounds such as alkyl tetralins. Nonalkyl aromatic materials such as benzene, indane, tetralin, and naphthalene may also be present. Olefins and saturated hydrocarbons such as paraffins may also be contained in these fractions but are generally undesirable since they undergo conversion exothermally before demethylation of xylenes to toluene or toluene to benzene occurs, and consume hydrogen and are converted principally to methane and thus dilute the reactants. It is preferable to maintain the concentration of non-aromatics to below 20 wt. percent and preferably below 2 wt. percent of the alkylated aromatic feed to the reactor.

An aromatic hydrocarbon feed may suitably boil in the range between about 170° and about 900° F. but preferably may boil in the range between about 170° and 550° F. While any aromatic hydrocarbon feed may be employed, the feed may suitably be a solvent extract of catalytic reformate or a kerosene fraction, such as a sulfur dioxide extract. The feed stock may also suitably be a heavy cracked naphtha, a gas oil, and the like, fractions thereof, or solvent extracts of such fractions. The feed stocks may contain from above 40% to 100% aromatics and may be obtained from aromatic-rich streams derived by solvent extraction of petroleum distillates or from fractions produced in catalytic conversion operations such as catalytic cracking or catalytic reforming. The aromatic feed may less desirably contain appreciable quantities of sulfur particularly when the aromatic fraction is a solvent extract of naturally occurring petroleum fractions. Sulfur in the feed stocks is undesirable since it is normally necessary to treat the reaction products to remove sulfur therefrom.

For the production of benzene, the preferred alkyl benzene feed stocks boil in the range of 230 to 350° F. and contain 85 to 100 wt. percent alkyl benzenes with 0–15 wt. percent paraffins and olefins. A particularly preferred feed stock is a toluene stream containing 99 to 100 wt. percent toluene with 0 to 1 wt. percent paraffin.

In accordance with this invention, there is added to the feed a small amount of nitrogen or sulfur compounds such as ammonia, amines, hydrogen sulfide, carbon disulfide or a lower aliphatic mercaptan. The amount of nitrogen or sulfur compound added should be such as to provide about 2 to 100 p.p.m. preferably about 10 to 20 p.p.m. of nitrogen or sulfur based on the total feed. If the other feed components already contain sulfur, the amount added should be adjusted to bring the total sulfur content of the feed within the limits indicated.

Hydrogen or a hydrogen-containing gas containing above 50 vol. percent hydrogen and preferably above about 80 to 90 vol. percent, e.g. 92 vol. percent hydrogen is used. The amount of hydrogen-containing gas supplied with the alkylated aromatic feed hydrocarbon should be sufficient to provide 1 to 6, preferably 2 to 4 mols of hydrogen per mol of alkylated aromatic feed.

The present invention is carried out in a reaction zone having a high $L/D$ ratio. This ratio will be in the range of 10 to 200, preferably 40 to 150, e.g. 65. The alkylated aromatic hydrocarbon feed and a hydrogen rich gas are heated together in a furnace to a temperature in the range of 1100° to 1300° F., preferably 1150 to 1200° F., e.g. 1175° F. and are then supplied to the reaction zone at pressures of from about 500 to about 1000 p.s.i.g., preferably 400 to 700 p.s.i.g., e.g. 600 p.s.i.g. The temperature in the reaction zone is controlled so that it does not exceed 1400° F. and is preferably maintained between about 1150 and about 1375° F. At temperatures about 1400° F. selectivity drops substantially with the resulting production of undesirable materials. The reactants travel in plug flow with little backmixing through the reaction zone. Contact time of the reactants at the above indicated reaction conditions may range from 2 to 120 seconds, preferably 20 to 100 seconds, e.g. 50 seconds.

Additional cool hydrogen-containing gas of the above concentration or lower hydrogen contact zones such as recovered from the reactor effluent is supplied at several points, preferably at about 3 to 10 points, more preferably about 6 points along the reaction zone to control temperatures in the exothermic reaction and to maintain the hydrogen concentration through the reactor. This hydrogen-containing gas is supplied at a temperature of 100 to 500° F. preferably 100 to 200° F., e.g. 130° F. The amount of gas required at each point will, of course, depend upon the number of quench points and the particular condition or combination of conditions tending to cause a temperature runaway. The total amount of hydrogen supplied at the several quench points (feed stocks other than alkyl tetralins) will ordinarily total from about 2 to 15 mols, preferably 3 to 10 mols, e.g. about 7 mols per mol of alkylated aromatic feed. Preferably the distribution of the hydrogen supplied at the various quench points and the location of these quench points is adjusted to control the temperature rise within 100 to 300° F., preferably 100 to 200° F., e.g. 125° F. Peak temperatures in the first half of the reactor are limited to less than 1300° F. and allowed to rise towards 1400° F. in the second half of the reactor. Lower peak temperatures at the beginning of the reactor are necessary in order to satisfactorily control the rapid, highly exothermic reactions. As reaction proceeds and the higher molecular weight non-aromatics disappear, the reaction rate falls off with decreasing reactant concentration. Hydrogen quench addition is also used to maintain high hydrogen concentrations in order to control and eliminate reactor coking. Maintenance of hydrogen concentrations through the reactor above 50 mol percent, preferably above 52 mol percent, e.g. 55 mol percent is preferred.

The vapors leaving the reaction zone are immediately quenched to reduce the temperature to below 1200° F., preferably below 1150° F., e.g. 1150° F. This final quenching may be effected by contacting the product with a cool hydrocarbon stream, an inert gas stream, with a hydrogen-containing stream, with steam or water or by discharging the hot reaction products through a restriction orifice directly into a quench tower containing a body of polymer or heavier products of the reaction maintained at a temperature sufficiently high to permit withdrawal of the dealkylated aromatic product, toluene, benzene etc. overhead. This quenching to the temperatures described is preferably obtained in about 1 to 5 seconds, e.g. 2 seconds to prevent undesirable side reactions such as polymerization. The direct liquid quench operation adds considerable flexibility since it permits one to run any alkylated aromatic such as xylenes which tend to form considerably more polymer.

The present invention will be more clearly understood from a consideration of a preferred reactor used for carrying out the present invention. FIGURE 1 depicts the reactor utilized, FIGURE 2 depicts an enlarged section at one of the quench points showing the nozzle arrangement utilized and FIGURE 3 depicts a front view of the baffle plate attached to the said nozzle.

Referring to FIGURE 1, the alkyl aromatic feed stream is supplied through line 1 and the hydrogen-containing gas is supplied through line 2 to furnace 3 wherein the temperature of the mixed gas stream is raised to reaction temperature. The heated stream is passed through line 4 to the inlet of reactor 5. It is preferable to provide an auxiliary hydrogen-containing gas inlet line 6 equipped with a temperature controlled valve 7 to serve as a trim quench to cool the reactants stream for rapid and fine temperature control. The reactor is preferably of serpentine form as shown in order to save space in the refinery although it may be a straight tube reactor arranged vertically or horizontally. In the reactor, the dealkylation reaction taking place gives off large amounts of heat and the reactants are quenched at a succession of points with a hydrogen-containing gas in order to control temperature and prevent temperature runaways. Thus, hydrogen is introduced through a number of lines 8, 9, 10, 11 and 12 arranged at spaced points along the reactor, each of which is equipped with a temperature controlled valve 13, 14, 15, 16 and 17. The temperature sensing element of each of these valves is located just downstream from the nozzles 18, 19, 20, 21 and 22 through which the hydrogen-containing coolant gas is discharged. A final quench with an inert gas, steam, water, hydrogen-containing gas, or preferably with dilute hydrogen-containing gas cheaply available in the refinery, is provided near the discharge end of the reactor. This stream is introduced through line 24 and nozzle 26 at a rate controlled by the temperature controlled valve 25. Reactants are quickly cooled to a temperature below 1150° F. These cooled reactants are then passed to recovery equipment through line 27.

In order to maintain better control of the reactor temperature and prevent temperature runaway particularly when the reactor is upset by a sudden, substantial variation in feed composition or inlet temperature or especially when variations in both occur simultaneously there is provided a feed forward control. The feed forward control in accordance with the present invention involves providing an additional quench gas inlet line 30 for supplying hydrogen-containing coolant gas through temperature controlled valve 31 to nozzle 32. The temperature sensing element for control valve 31 is arranged upstream of the nozzle 32 in relatively close proximity to the inlet end of the reactor since the major control difficulty occurs in the first portion of the reactor due to the high heat release in this section. A particularly satisfactory arrangement of coolant nozzles would be one in which the nozzles 18, 19 and 20 are arranged at a distance equal to 350, 600, 800 cubic feet of reactor volume and that additional nozzles be provided at intervals of about 200 cubic feet of reactor volume thereafter. The sensing element for the feed forward control should be arranged at a distance equal to 200 cubic feet of reactor volume from the reactor inlet and that the distance from the sensing element or thermocouple to the feed forward quench should be equal to about 300 cubic feet of reactor volume. The feed forward quench in accordance with the present invention is particularly valuable and is in fact essential to prevent temperature runaway during compressor failure and for the simultaneous feed temperature and paraffin concentration upset.

Turning now to FIGURE 2 wherein an enlarged section at one of the quenching points is depicted, the hydrogen-containing quench gas is supplied through line 8 through a sleeve 34 in the wall of the reactor 5 to the nozzle-baffle 18, 35 arrangement positioned essentially centrally of the reactor. The nozzles are preferably positioned to discharge the hydrogen-containing coolant stream upstream of the reactor for more effective mixing. The mixture of reactants and coolant gas then impinges on the circular plate of baffle 35 which is supported on the line 36 arranged perpendicular to the flow of reactants through the reactor tube. The baffle 35 serves to produce turbulence in and thus better mixing of the reactants and coolant with a slot 37 to facilitate the attachment of baffle 35 to the inlet line 36.

Other types of injection and mixing devices could be employed; for example, the nozzle can be located pointing downstream with the baffle plate located downstream of the nozzle serving both as a target plate and as a distributor for the vapors causing thorough mixing of the reactants and coolant as they pass around the plate. Alternatively, an injector-venturi combination or injection ball can be used.

In a preferred embodiment, the reactor effluent is quenched by discharge thereof into the quench tower 40 containing a body of heavy liquid product or polymer. If a quench tower is employed, it is not necessary to use the final quench 24, 25 and 26. With a quench tower, a line restriction 45 is arranged at the point of discharge of the reactants into the quench tower in order to avoid any danger of back flow of the liquid quench medium from tower 40 into the reactor 5. A pumparound 41 equipped with a heat exchanger 42 is provided for recirculating the liquid quench medium and controlling its temperature. The desired dealkylated aromatic products and the hydrogen-rich gases are taken overhead from quench tower 40 via outlet line 43 for further processing and separation and then passed to product storage or final purification. Excess liquid quench medium is withdrawn from quench tower 40 via liquid outlet line 44.

The present invention will be more clearly understood from a consideration of specific examples describing preferred methods of carrying out the present invention.

EXAMPLE 1

The feed stock utilized is a fraction boiling between about 400 and 600° F. obtained from a sulfur dioxide extract of catalytic heating oil. This feed contains 17 wt. percent paraffins, 13 wt. percent alkyl benzenes, 19 wt. percent indanes, 35 wt. percent alkyl naphthalenes, 3 wt. percent tetralins and 14 wt. percent other aromatics such as acenaphthene and phenanthrene boiling in this range. This feed is supplied with 3.1 mols per mol of feed of a 92% hydrogen stream (the remainder being essentially methane) to the furnace shown in FIGURE 1 at a temperature of 850° F. In this furnace the combined stream is heated to a temperature of 1100° F. in approximately three seconds. The 1100° F. stream is supplied to an internally lined reactor operating at 600 p.s.i.g. wherein in the first section the temperature rises to 1225° F. and is quenched with the same 92% hydrogen-containing gas to a temperature of 1150° F. This quench gas is supplied at 130° F., and the amount of the gas is 1.5 mols per mol of feed. At the second quench point the temperature is 1260° F. and 2.2 mols of the hydrogen-containing gas per mol of hydrocarbon feed (introduced at the same temperature as above) is utilized to cool the reactants to 1160° F. At the third quench point the temperature is 1310° F. and 3.5 mols of the same hydrogen-containing gas per mol of hydrocarbon feed, again at the same temperature, is used to cool the reactants to a temperature of 1160° F. The final quench is with recycle gas from the process without hydrogen enrichment containing 60 mol percent hydrogen, the remainder being light hydrocarbons and principally methane. This gas is supplied at a temperature of 100° F. and the amount of the final quench gas is 4.4 mols per mol of reactants. This quench cools the gases to a temperature of 1150° F. The approximate vapor velocity in the reactor varies from 1.5 at the inlet to 4.5 feet/second at the outlet and the contact time is about 50 seconds. For these conditions, about 95% of the alkyl aromatics are dealkylated into the desired product of benzene and naphthalene.

EXAMPLE 2

Feed stock:
    36.5 mol percent toluene
    62.5 mol percent xylenes
    1.0 mol percent paraffins
    230/295° F. boiling range
    5.0 mols $H_2$/mol aromatic
    90% $H_2$ purity Furnace:
    Inlet—500° F.
    Outlet—1160° F.

Reactor pressure—600 p.s.i.g.
    Inlet—1140° F.
    Holdup—40 sec. approx.

*Temperature profile*

| Percent of Reac. Vol. | Temp.[1] ° F. | Remarks |
|---|---|---|
| 0 | 1,140 | Inlet. |
| 9 | 1,166 | Feed Forward control point.[2] |
| 17.5 | 1,186 | 1st quench. |
| 30 | 1,231 | 2d quench. |
| 40 | 1,239 | 3d quench. |
| 50 | 1,257 | 4th quench. |
| 67.5 | 1,275 | 5th quench. |
| 75 | 1,289 | 6th quench. |
| 87.5 | 1,298 | 7th quench. |
| 100 | 1,300 | Outlet. |

[1] Temperatures after quench added where applicable. Normal quench temp. drop is about 20° F.
[2] Feed forward control added at 22.5% of volume.

Quench gas:
    61 mol percent $H_2$ at 220° F.
    2.7 mols quench gas/mol aromatic Velocity:
    Inlet—2.3 f./s.
    Outlet—3.7 f./s.

| Dealkylation | In | Out | |
|---|---|---|---|
| Toluene | 260 | 69 | $\frac{705-76}{705}=90\%$ |
| Xylenes | 445 | 7 | |
| | 705 | 76 | |

EXAMPLE 3

Feed stock:
    66.7 mol percent toluene
    32.6 mol percent xylenes
    0.7 mol percent paraffins
    230/295° F. boiling range
    5 mols $H_2$/mol aromatics
    90% $H_2$ purity Furnace, reactor conditions absolutely the same as Example 2.

Quench gas:
    2.2 mols/mol aromatic
    62 mol percent $H_2$ at 220° F.

Velocity:
    Inlet—2.4 f./s.
    Outlet—3.9 f./s.

| Dealkylation | In | Out | |
|---|---|---|---|
| Toluene | 593 | 85 | $\frac{853-88}{853}=90\%$ |
| Xylenes | 270 | 3 | |
| | 853 | 88 | |

It is to be understood that this invention is not limited to the specific examples, which have been offered merely as illustrations, and that modifications may be made without departing from the spirit of this invention.

What is claimed is:

1. The process for the thermal non-catalytic hydrodealkylation of alkyl substituted aromatic hydrocarbons which comprises heating these hydrocarbons with 1 to 6 mols of hydrogen per mol of hydrocarbon to a temperature in the range of 1050 to 1300° F., supplying the reactants to a reactor having an $L/D$ ratio of 10:1 to 200:1 and which is free of extraneous solids, controlling the temperature in the reaction so that it does not exceed about 1400° F. by adding a cool hydrogen-containing gas containing more than 60 mol percent hydrogen at several points spaced downstream from the entrance to the reactor and finally quenching the reactants to a temperature below 1200° F.

2. The process of claim 1 in which the total amount of the hydrogen-containing gas supplied at the points spaced downstream from the entrance of the reactor is 2 to 15 mols per mol of alkylated aromatic feed.

3. The process of claim 1 in which the hydrogen-containing gas added downstream from the entrance to the reactor is supplied at a temperature of 100 to 500° F.

4. The process of claim 1 in which the cool hydrogen-containing gas is introduced at from 2 to 10 points spaced downstream from the entrance to the reactor.

5. The process of claim 1 in which the feed supplied to the reactor is an aromatic hydrocarbon feed boiling in the range of 170° to 900° F. containing from 40 to 100% aromatics.

6. The process of claim 1 in which the hydrocarbon feed is toluene.

7. The process of claim 1 in which the hydrocarbon feed is a mixture containing a major proportion of xylenes and a minor proportion of toluene.

8. The process of claim 1 in which the hydrocarbon feed is an alkyl naphthalene feed stock boiling in the range of 420 to 550° F., containing 50 to 100 wt. percent naphthalene and alkyl naphthalenes.

9. The process of claim 1 in which the $L/D$ ratio of the reactor is 40:1 to 150:1.

10. The process as defined in claim 1 in which the temperature of the reaction mixture is measured in close proximity to the reactor inlet and hydrogen containing gas is added downstream of the point at which the temperature is measured, the amount of hydrogen-containing gas added varying in response to the temperature measurement to maintain the temperature of the reaction mixture below a runaway temperature level.

11. The process for the thermal non-catalytic hydrodealkylation of alkyl substituted aromatic hydrocarbons which comprises heating said hydrocarbons with 1 to 6 mols of hydrogen per mol of hydrocarbon and from 2 to 100 p.p.m. of a member of the group consisting of nitrogen and sulfur based on the total feed to a temperature in the range of 1100 to 1300° F., supplying the preheated reactants to a reactor having an $L/D$ ratio of 10:1 to 200:1 and which is free of extraneous solids, controlling the temperature in the reactor so that it does not exceed about 1400° F. by adding a cool gas containing more than 60 mol percent hydrogen at several points downstream from the entrance to the reactor, quenching the reactants to a temperature below 1200° F. and recovering dealkylated aromatics from the reaction products.

12. The process of claim 11 in which the total amount of the hydrogen-containing gas supplied at the points spaced downstream from the entrance of the reactor is 2 to 15 mols per mol of alkylated aromatic feed.

13. The process as defined in claim 11 in which the amount of hydrogen-containing gas supplied to the reactor downstream of the entrance to the reactor is 2 to 15 mols per mol of alkylated aromatic feed and is supplied at a temperature of 100 to 500° F.

14. The process as defined in claim 11 in which the alkylated aromatic hydrocarbon feed is toluene and the dealkylated product is benzene.

15. The process as defined in claim 11 in which the alkylated aromatic feed is xylene and the dealkylated products are benzene and toluene.

16. The process as defined in claim 11 in which the temperature of the reaction mixture is measured in close proximity to the reactor inlet and hydrogen-containing gas is added downstream of the point at which the temperature is measured, the amount of hydrogen-containing gas added varying in response to the temperature measurement to maintain the temperature of the reaction mixture below a runaway temperature level.

17. The process for the thermal non-catalytic hydrodealkylation of alkyl substituted aromatic hydrocarbons which comprises adding to a feed stream comprising said hydrocarbons and about 1 to 6 mols of hydrogen per mol of hydrocarbons an amount of a compound sufficient to provide from about 2 to 100 p.p.m. based on total feed of a member of the group consisting of nitrogen and sulfur, heating the resultant mixture to 1150 to 1200° F., discharging the preheated reaction mixture into a reaction zone having an $L/D$ ratio of 10:1 to 200 to 1 and which is free of extraneous solids, controlling the temperature in the reactor so that it does not exceed 1400° F. by adding a cool gas containing more than 60 mol percent hydrogen at a plurality of successive points downstream from the inlet to the reaction zone, quenching the reactants to a temperature below 1200° F. and recovering dealkylated aromatics from the reaction products.

18. The process as defined in claim 17 in which the temperature is maintained below 1300° F. in the first half of the reaction zone and is allowed to rise above 1300° F. in the last half of the reaction zone.

19. The process as defined in claim 17 in which the temperature of the reaction mixture is measured in close proximity to the reactor inlet and hydrogen-containing gas is added downstream of the point at which the temperature is measured, the amount of hydrogen-containing gas added varying in response to the temperature measurement to maintain the temperature of the reaction mixture below a runaway temperature level.

20. The process for the thermal non-catalytic hydrodealkylation of alkyl substituted aromatic hydrocarbons which comprises heating these hydrocarbons with 1 to 6 mols of hydrogen per mol of hydrocarbon to a temperature in the range of 1050 to 1300° F., supplying the reactants to a reactor having an $L/D$ ratio of 10:1 to 200:1 and which is free of extraneous solids, controlling the temperature in the reaction so that it does not exceed about 1400° F. by adding a cool hydrogen-containing gas containing more than 50 mol percent hydrogen at several points spaced downstream from the entrance to the reactor and finally quenching the reactants to a temperature below 1200° F.

References Cited by the Examiner

UNITED STATES PATENTS

| | | | |
|---|---|---|---|
| 2,099,350 | 11/1937 | Stoesser | 208—48 X |
| 2,168,840 | 8/1939 | Groll | 208—48 X |
| 2,206,729 | 7/1940 | Pier et al. | 208—112 |
| 2,331,343 | 10/1943 | Phillips | 208—248 |
| 2,422,673 | 6/1947 | Haensel et al. | 260—672 |
| 2,993,855 | 7/1961 | Fear | 208—144 X |

FOREIGN PATENTS 790,595   2/1958   Great Britain.

DELBERT E. GANTZ, *Primary Examiner.*

ALPHONSO D. SULLIVAN, *Examiner.*

C. R. DAVIS, *Assistant Examiner.*